March 24, 1942.  F. J. PARR  2,277,450
POTATO HARVESTER
Filed Aug. 7, 1941  2 Sheets-Sheet 1
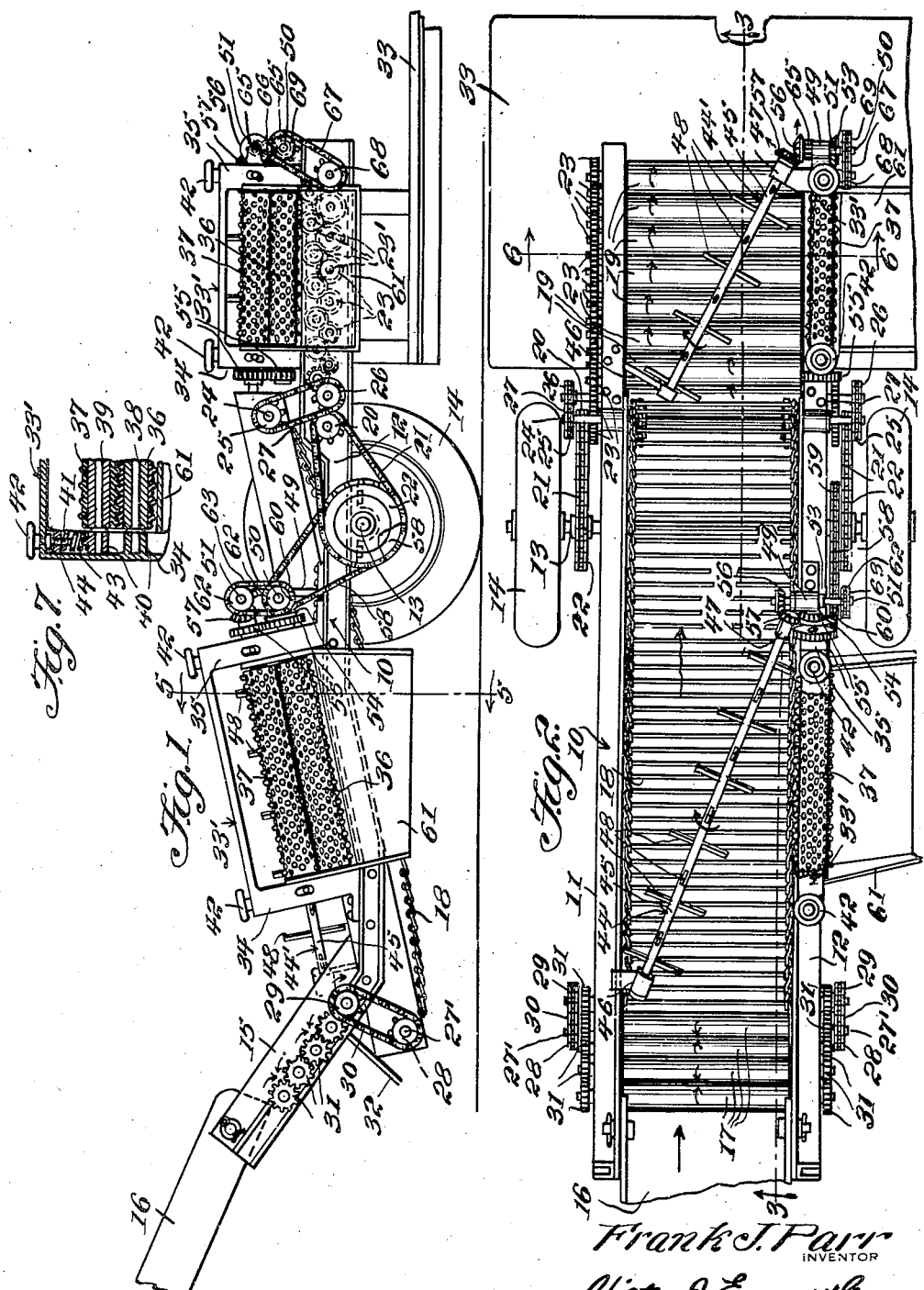
Frank J. Parr
INVENTOR
BY Victor J. Evans & Co.
ATTORNEYS
WITNESS March 24, 1942.  F. J. PARR  2,277,450
POTATO HARVESTER
Filed Aug. 7, 1941  2 Sheets-Sheet 2
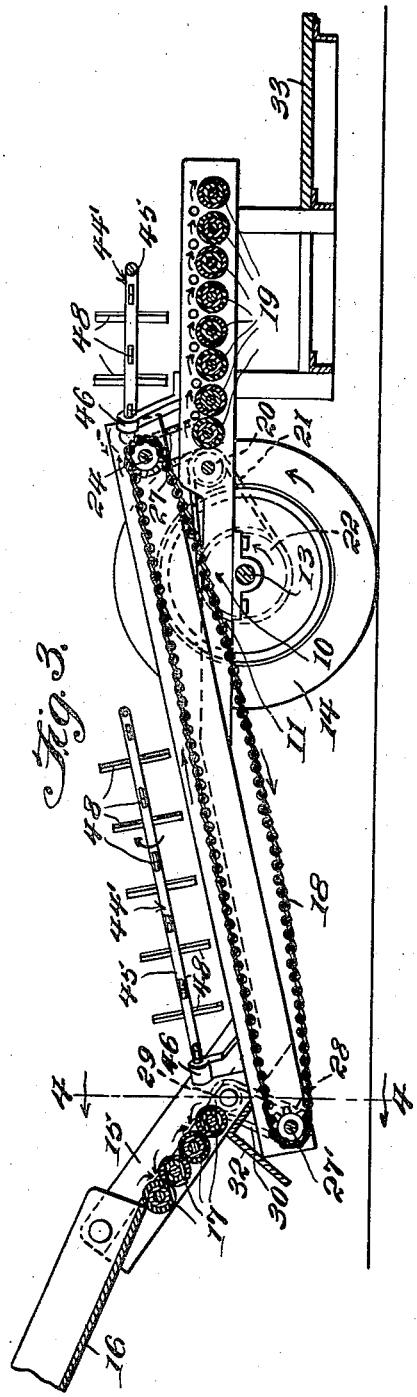
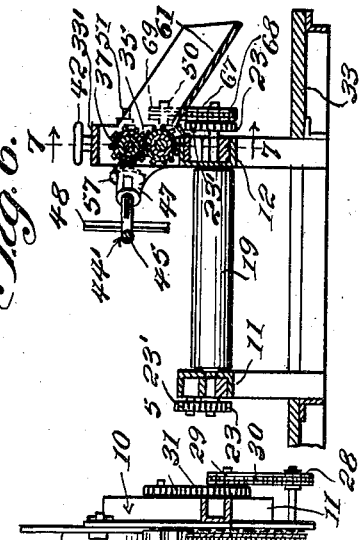
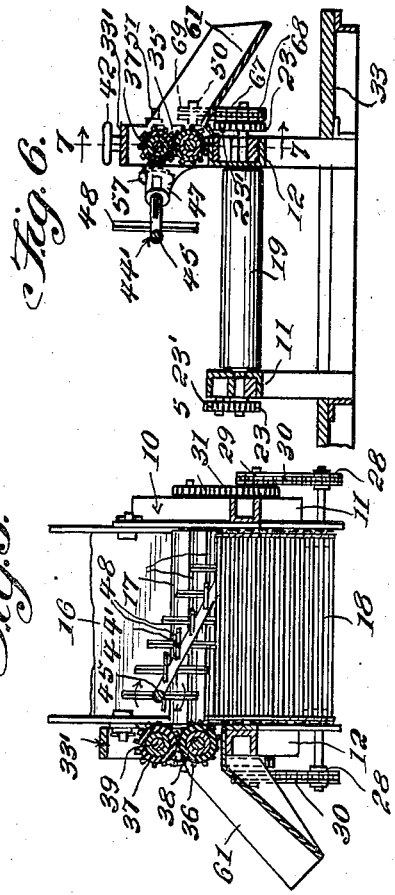
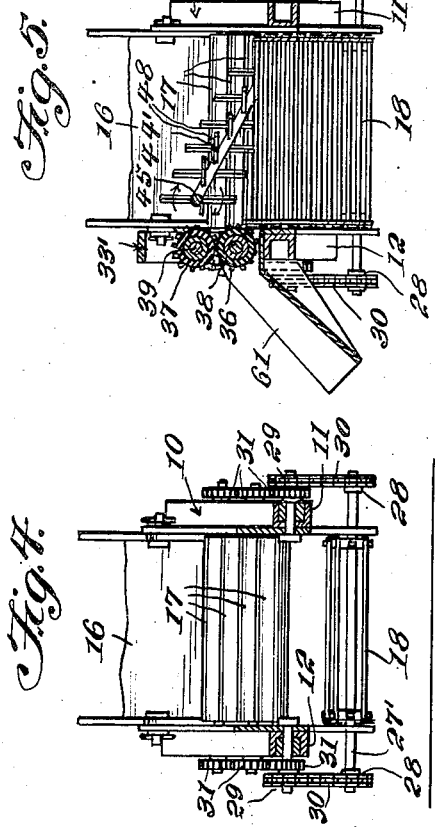
Frank J. Parr
INVENTOR
BY Victor J. Evans & Co.
ATTORNEYS Patented Mar. 24, 1942

2,277,450

UNITED STATES PATENT OFFICE 2,277,450

POTATO HARVESTER

Frank J. Parr, Eaton Rapids, Mich.

Application August 7, 1941, Serial No. 405,881

7 Claims. (Cl. 130—30)

My invention relates to new and useful improvements in potato harvesting devices.

An important object of my invention is the provision of a harvester for potato plants that is uniquely constructed to separate the vine portion of the plant from the root portion thereof and that will deliver the root portion at a point remote from the said vine portion.

Another object of my invention is the provision of a device of the above mentioned character that is readily portable and that is provided with traction wheels which operate the moving parts of the device.

Still another object of my invention is the provision of a device of the above mentioned character that is simple in its construction, efficient in operation and inexpensive to manufacture.

Other objects and advantages of my invention will be apparent during the course of the following description.

In the drawings, forming a part of this specification, and wherein like numerals are employed to designate like parts throughout the same, Figure 1 is a side elevation of a device embodying my invention and showing the same operatively associated with a potato harvester of conventional construction, Figure 2 is a top plan view of the same, Figure 3 is a longitudinal sectional view taken on the line 3—3 of Figure 2, Figure 4 is a vertical sectional view taken on the line 4—4 of Figure 3, Figure 5 is a vertical sectional view taken on the line 5—5 of Figure 1, Figure 6 is a vertical sectional view taken on the line 6—6 of Figure 2, and Figure 7 is a fragmentary vertical sectional view taken on the line 7—7 of Figure 6.

In the accompanying drawings, wherein for the purpose of illustration, is shown a preferred embodiment of my invention, the numeral 10 designates a portable frame upon which the various adjuncts and appurtenances of the invention are mounted. The frame includes longitudinally extending laterally spaced parallel side members 11 and 12 suitably connected at intervals along their length by transverse members (not shown). An axle 13 is mounted adjacent the rearward end of the frame and the opposite ends of the axle extend substantially beyond the side members 11 and 12 to position the wheels 14 mounted thereon in laterally spaced relation with the side members. Side boards 15 are mounted on the angularly upwardly inclined forward end of the side members and the side boards are attached to the delivery chute 16 of a conventional potato harvester. The side boards extend substantially above the side members of the frame whereby to position the plurality of contiguously arranged rollers 17 in alignment with the bottom of the chute. The potatoes, potato vines, weeds and particles of soil delivered by the chute 16 will be carried by the rollers 17 toward the forward end of an endless conveyor 18 which extends angularly upwardly towards the rear of the frame as best illustrated in Figures 1 and 3. Mounted at the rearward end of the frame and below the rearward end of the endless conveyor 18 is a plurality of horizontally arranged, laterally spaced rollers 19.

The sets of rollers 17 and 19 and the intermediately positioned endless conveyor 18 may be actuated in any suitable manner; however, I prefer that the same be driven from the axle 13. A sprocket 20 is mounted for rotation on each of the side members of the frame, the said sprockets being arranged in outwardly spaced relation with their respective members to receive the endless chain 21 which extends around the sprockets 22 fixedly carried by the portions of the axle 13 extending laterally of the frame. The shaft of the foremost roller 19 extends beyond the side members 11 and 12 and the shaft of each of the rollers arranged rearwardly thereof extends beyond the member 11 only. Spur gears 23 are mounted on each end of the foremost roller shaft and on the end of each of the other roller shafts extending laterally of the member 11. All of the spur gears arranged laterally of the member 11 mesh with the idler gears 23'.

Movement of the harvester along the ground will cause the traction wheels 14 to rotate in any anti-clockwise direction, as shown by the arrow in Figure 1, to permit the endless chains 21 to drive the sprockets 20 in a similar direction. Each of the sprocket shafts also carry a spur gear 23, which gears mesh with the spur gears at each end of the foremost roller shaft whereby the foremost roller will be rotated in a clockwise direction and, obviously, the idler gear 23' will impart a similar rotation to each of the other rollers.

The opposite ends of the shaft 24 supporting the rearward end of the endless conveyor 18 extend substantially beyond the side members of the frame and the extending ends of the shaft have sprockets 25 fixedly associated therewith. Sprockets 26 are also mounted on the extending ends of the foremost roller shaft whereby the endless chains 27 connecting the sprockets 25 and 26 will drive the endless conveyor in a clockwise direction. It may thus be seen that the upper run of the endless conveyor will travel toward the rearward end of the harvester to deliver the potatoes onto the rollers 19.

The extending ends of the shaft 27' supporting the forward end of the endless conveyor 17 have sprockets 28 fixedly associated therewith and the extending ends of the shaft carrying the rearmost of the rollers 17 have sprockets 29 fixedly associated therewith whereby the endless chains 30 connecting the sprockets 28 and 29 will drive the rearmost of the rollers 17 in a clockwise direction. The shaft of each of the rollers 17 extends beyond the side members of the frame and each of the extending ends is provided with a spur gear 31, each of the spur gears being meshed with the spur gear adjacent thereto whereby the adjacent rollers 17 will be made to rotate in opposite directions.

The purpose of the rollers 17 is to remove the soil adhering to the potatoes as they roll by gravity thereacross. The continuous rotation of the rollers will thoroughly agitate the potatoes and the manner in which adjacent pairs of the rollers rotate in opposite directions will cause the soil falling from the potatoes to pass between the rollers and fall upon the ground in advance of the harvesting device. In order that the soil will be prevented from falling upon the forward end of the conveyor and about the gears and endless chains associated therewith, I have provided a shield 32 which is attached to the frame and is arranged above and in covering relation to the forward end of the conveyor. As the potatoes pass from the rollers 17 and onto the upper run of the endless conveyor 18 they will be further agitated by a contact with the transverse rods of the conveyor to further effect removal of the soil adhering thereto. It might be well to note at this point that the manner in which the endless conveyor is inclined angularly upwardly toward the rear of the device will cause the potatoes to tend to roll toward the forward end of the conveyor whereby to effect further agitation of the same. The inclination of the conveyor from the horizontal however is not sufficient to prevent the conveyor from transporting the potatoes onto the rollers 19 at the rearward end of the frame. Attention is again directed to the fact that the rollers 19 are arranged in spaced relation with each other. By arranging the rollers 19 in this manner the progress of the potatoes thereacross is substantially retarded and the potatoes are again thoroughly shaken or agitated to remove any last particles of soil adhering thereto. The potatoes discharge from the rollers 19 into a suitable receptable supported by the platform 33 mounted therebelow at the rearward end of the frame. I prefer that the platform extend rearwardly and to each side of the frame so that a plurality of the containers may be carried thereby in order to expedite the harvesting of the potatoes.

I have provided means associated with the endless conveyor and with the rearmost rollers 19 for removing the weeds and vines delivered to the conveyor by the harvester to which the device is attached. These means are identical in their construction and operation and a detailed description of but one will therefore be given.

Each of the above mentioned means include a supporting standard 33' which is attached to one of the side members of the frame. The supporting standards are herein illustrated as being mounted on the side member 12 and as including longitudinally spaced upright channel members 34 and 35. A pair of vertically stacked rollers 36 and 37 are mounted between the upright members of the support and the opposite ends of the shafts 38 and 39 thereof extend into the channels of the said upright portions. The portions of the roller shafts extending into the channels are provided with bearings 40 which rotatably support the shafts and which are vertically movable within the channel. The screw threaded shank portions 41 of the hand wheels 42 extend downwardly through the supports and into the channels of the upright members 34 and 35. Coil springs 43 are interposed between a plate 44 carried by the end of the shank portion of the hand wheel and the bearing 40 of the upper roller 37 whereby rotation of the hand wheel will act through the medium of the coil springs 43 to regulate the pressed engagement of the rollers with each other. As best illustrated in Figure 1, each of the rollers is provided with a plurality of peripheral teeth or knobs which interengage to grip any vines or weeds carried by the conveyor 18 or by the rollers 19. Arranged diagonally of the conveyor 18 and of the rollers 19 are agitators 44' each of which includes a shaft 45 journalled in the brackets 46 and 47 at opposite sides of the frame and at opposite sides of each of the sets of rollers 36 and 37. Intermediate its supporting brackets each of the shafts is provided with a plurality of radially extending inherently resilient arms 48 which sweep the top surface of the conveyor and rollers to gather the vines and weeds carried thereby and to feed the same into the stacked rollers disposed laterally thereof.

Uprights 49 mounted rearwardly of each set of rollers are provided with vertically spaced bearings which support the stub shafts 50 and 51. The lower stub shaft 50 is provided at its outer end with a beveled gear 53 which meshes with a beveled gear 54 carried by the rearward end of the lower roller shaft 38. As best illustrated in Figure 1 each of the rollers 36 and 37 is actuated through the medium of a spur gear 55 mounted on the rearwardly extending ends of their respective shafts. The upper stub shaft 51 is provided at its inner end with a beveled gear 56 which meshes with a beveled gear 57 carried by the rearward end of its respective agitator shaft 45. The front set of rollers arranged laterally of the endless conveyor 18 is driven by an endless chain 58 which connects the sprocket 59 carried by the axle 13 to a sprocket 60 carried by the lower stub shaft 50. Obviously, rotation of the driving axle 13 will effect rotation of the endless chain 58 and the chain will, in turn, impart this rotation to the lower stub shaft 50. The beveled gear 53 carried by the stub shaft will drive the beveled gear 54 mounted on the extending end of the lower roller shaft to drive the lower roller in the direction of the arrow in Figure 1, the meshed spur gear carried by the shafts of the respective rollers will effect opposite rotation of the rollers whereby to carry the weeds and vines outwardly from the frame and onto the chutes 61. Each of the stub shafts 50 and 51 is also provided with a sprocket 62 and the sprockets are connected by an endless chain 63 so that rotation of the lower shaft will drive the upper stub shaft and effect rotation of the agitator shaft 45. As indicated by the arrow in Figure 2, the agitator shaft is caused to rotate in a direction away from the rollers whereby to gather the weeds and vines carried by the conveyor and horizontal rollers 19 and to feed the same rearwardly and into the stacked rollers.

The construction and operation of the rearward set of stacked rollers mounted laterally of the horizontal rollers 19 is identical with the above described construction with the exception of the fact that the stub shafts are provided at the inner ends thereof with spur gears 65 which are connected by an intermediate idler gear 66. It will be noted that the lower stub shaft 65 is driven by an endless chain 67 which is trained about a sprocket 68 on the rearmost roller shaft of the set of rollers 19 and about a sprocket 69 carried by the lower stub shaft 50. As will be remembered, all of the rollers 19 rotate in a clockwise direction whereby the lower stub shaft will also be caused to rotate in a clockwise direction whereby the spur gears connecting the vertically spaced rollers 36 and 37 will cause the rollers to rotate in opposite directions and in a manner to feed the vines and weeds to the outside of the machine. By providing the idler gear 66 between the spur gears 65 of the stub shafts the upper stub shaft is caused to rotate in an anti-clockwise direction whereby to rotate the agitator shaft 45 in a direction away from the stacked rollers so that the same may gather the vines and weeds traversing the rollers and to feed the same to the stacked rollers.

It may thus be seen that I have provided a potato harvesting device which is adapted to be attached to a conventional potato harvester and pulled therebehind. The potatoes are extracted from the ground in the conventional manner and are delivered by the chute 61 onto the forward set of rollers 17 of my device. These rollers are continuously rotated and are uniquely constructed to efficaciously remove particles of soil adhering to the potatoes. In the past considerable difficulty has been encountered by reason of the fact that a considerable portion of the potato vines are also carried with the potatoes and by the fact that weeds growing beside the potatoes are carried to the containers. A large portion of the soil adhering to the potatoes is removed by the rollers 17 and as the potatoes, vines and weeds are delivered to the endless conveyor 18 the entire mass is moved rearwardly of the device and in the direction of the rearward set of rollers 19. As they pass under the agitator 44 the radial arms 48 thereof sweep the vines and weeds into the stacked rollers 36 and 37 which deliver the same to the chute 61 from which they fall to the ground at one side of the device. If the first agitator 44 should fail to remove all of the vines and weeds the rear agitator sweeping the set of rollers 19 will remove the same and deposit them on the ground at one side of the device in the manner hereinabove described. Experience teaches that by the time the potatoes have traversed the rear set of rollers 19 all particles of soil adhering thereto have been removed and upon the deposit thereof into the containers carried by the platform 33 they are entirely clean and free from foreign matter.

I prefer that the gears 23 which drive the rollers 19 be of gradually increasing size toward the rear of the device whereby the rollers will be rotated at progressively decreasing speed. By progressively slowing the rate of speed at which the rollers rotate the movement of the potatoes thereacross is substantially retarded whereby to permit the last particles of soil adhering thereto to be removed.

It is to be understood that the form of my invention, herewith shown and described, is to be taken as a preferred example of the same, and that various changes in the size, shape and arrangement of parts may be resorted to without departing from the spirit of my invention, or the scope of the appended claims.

Having thus described my invention, I claim:

1. A potato harvester comprising a portable frame, an endless conveyor arranged longitudinally of the frame, a plurality of contiguously disposed rollers arranged at the forward end of the conveyor and in a plane inclined angularly upwardly therefrom for delivering potatoes thereto, means for driving the rollers of adjacent pairs in opposite directions, means arranged at one side of the said conveyor for removing vines and weeds carried by the conveyor, an agitator arranged diagonally above the conveyor and laterally of the vine removing means for gathering the vines and weeds and feeding the same to the said removing means, a plurality of horizontally arranged laterally spaced rollers positioned at the rearward end of the said conveyor, and means for driving all of the last mentioned rollers in the same direction.

2. A potato harvester comprising a portable frame, and endless conveyor arranged longitudinally of the frame, stacked rollers arranged at one side of the said conveyor, an agitator arranged diagonally above the conveyor and laterally of the rollers for gathering vines and weeds carried by the conveyor and feeding the same to the said rollers, drive means for actuating the said conveyor, rollers and agitator, a plurality of horizontally arranged laterally spaced rollers positioned at the rearward end of the said conveyor, said rollers having a driven connection with the drive means and the connection being such that all of the last mentioned rollers rotate in a direction away from the said conveyor.

3. A potato harvester comprising a portable frame, an endless conveyor arranged longitudinally of the frame, a plurality of contiguously disposed rollers arranged at the forward end of the conveyor and in a plane inclined angularly upwardly therefrom for delivering potatoes thereto, drive means for actuating the conveyor and rollers, a rotatable shaft arranged diagonally above the conveyor and laterally of the second mentioned rollers and having a driven connection with the said drive means, and fingers extending radially from the shaft for sweeping the surface of the conveyor and feeding vines and weeds carried thereon to the said second mentioned rollers.

4. A potato harvester comprising a portable frame, an endless conveyor arranged longitudinally of the frame, a plurality of contiguously disposed rollers arranged at the forward end of the conveyor and in a plane inclined angularly upwardly therefrom for delivering potatoes thereto, drive means for actuating the conveyor and rollers, a rotatable shaft arranged diagonally above the conveyor and laterally of the second mentioned rollers and having a driven connection with the said drive means, fingers extending radially from the shaft for sweeping the surface of the conveyor and feeding vines and weeds carried thereon to the said rollers, a plurality of horizontally arranged laterally spaced rollers positioned at the rearward end of the said conveyor, and means for driving all of the last mentioned rollers in the same direction.

5. A potato harvester, comprising a portable frame, an endless inclined conveyor arranged longitudinally of the frame, a pair of rollers arranged at one side of said conveyor having their contacting surfaces above the conveyor, an agitator arranged diagonally above the conveyor and terminating above the upper end of the rollers for gathering vines and weeds carried by the conveyor and feeding the same to said rollers, and drive means for actuating said conveyor, rollers and agitator.

6. A potato harvester, comprising a portable frame, an endless inclined conveyor arranged longitudinally of the frame, a pair of rollers arranged at one side of the said conveyor and spaced some distance from the ends thereof with their contacting faces above a plane with the conveyor, an agitator arranged above the conveyor and starting at one side thereof at the lower end and extending diagonally across the conveyor and terminating at the opposite side above the upper ends of the rollers, whereby the vines and weeds are conveyed to the rollers.

7. A potato harvester, comprising a portable frame, an endless conveyor arranged longitudinally of the frame and inclined upwardly, two rollers arranged at one side intermediate the upper and lower ends of the conveyor and having their contacting faces above the conveyor, an agitator above the conveyor and starting at one side thereof and extending diagonally across the same to the other side above the rollers, a series of rollers adapted to receive the potatoes from the upper ends of the endless conveyor, a diagonal agitator extending from end to end of said rollers, and two spaced rollers extending across one end of the last mentioned rollers and having their contacting faces above the rollers.

FRANK J. PARR.